United States Patent Office 3,022,223
Patented Feb. 20, 1962

3,022,223
BIOSYNTHESIS OF α-KETOGLUTARIC ACID
Eric A. Borel, Wilmington, Del., assignor to Hercules Powder Company, Wilmington, Del., a corporation of Delaware
No Drawing. Filed June 10, 1960, Ser. No. 35,118
3 Claims. (Cl. 195—29)

This invention relates to a process of producing α-ketoglutaric acid and more particularly to a process of microbiologically converting D-glutamic acid in a racemic mixture of DL-glutamic acid to α-ketoglutaric acid without substantially affecting the L-glutamic acid.

As will become more apparent hereinafter, the process of the present invention has the advantages that it not only provides a means of making α-ketoglutaric acid from a DL-glutamic acid racemic mixture, but it also serves as a very satisfactory means of separating the two acids in the racemic mixture.

All known methods of producing glutamic acid by chemical synthesis result in a racemic mixture, i.e. a 50:50 mixture of L-glutamic acid and D-glutamic acid. The monosodium salt of L-glutamic acid is widely used as a flavor enhancer. The monosodium salt of D-glutamic acid is not a flavor enhancer, is not permitted in food by the United States Food and Drug Administration, and some literature references mention its toxicity to the normal metabolism of certain living cells. Thus the necessity of obtaining the L-glutamic acid substantially free of the D-glutamic acid is apparent. However, this involves a difficult problem because the two forms of the acid are identical in all respects except their spacial configuration, i.e., they are enantiomorphs. Being enantiomorphs, the two forms of the acid in a racemic mixture are extremely difficult to separate, or to resolve, as it is often referred to in this art.

The art has proposed a number of processes for accomplishing this resolution, but none of them are as satisfactory as desired. These prior art processes may be divided into three categories, namely the physical processes, the physical chemical processes and the biological processes. One physical process involves the direct separation of the enantiomorphs in a racemic mixture by seeding a supersaturated solution. Generally one of the optically active forms of the same acid is used to cause one form to crystallize out, leaving the other behind. The yields are low and require a long precipitation time. A physical chemical process involves fractional crystallization of the diastereoisomers of these enantiomorphs, i.e., salts formed from the DL-acids with optically active acids or bases. This method is based on the fact that diastereoisomers have different physical properties. By combining DL-glutamic acid or derivatives with an optically active base or acid, the new compounds will possess different solubilities and can be resolved by fractional crystallization from water, ethanol, or methanol and hydrolyzed to yield the free optically active amino acid. The more soluble salt in the mother liquor is also hydrolyzed and the isomeric amino acid recovered. This method requires additional chemical synthesis, large amounts of optically active compounds, long precipitation times, and a tedious sequence of recrystallizations. Too, the yields are low. One biological prior art process is asymmetric synthesis. This process takes advantage of the fact that proteolytic enzymes are able to synthesize protein structure from L-amino acids or derivatives but not from the D-isomers. This enantiomorphal specificity can be used to separate DL-glutamic acid. Another prior art biological process is asymmetric hydrolysis. This method depends on hydrolytic enzymes to remove by specific hydrolysis added substituent groups of amino acid racemate derivatives. Their biological agents are nearly exclusively L-directed. Still another prior art biological process is asymmetric oxidation or decarboxylation. This method is based on direct asymmetric biological oxidation or decarboxylation of one or the other enantiomorphs of a racemic mixture, leaving one form of the isomer and probably the α-keto- or decarboxylated analog of the other. The reactions mentioned in the literature are carried out either with enzyme preparations from various organs or with cell-free extracts from different microorganisms.

Thus, the prior art processes have a number of drawbacks. The drawbacks of the physical and also the physical chemical prior art processes include the facts that they are complicated, require long precipitation times, require large amounts of optically active compounds, and give low yields. The drawbacks of the prior art biological processes include the requirement for preliminary chemical synthesis of derivatives, the use of isolated enzyme systems, and the use of hydrolytic or fractional recrystallization steps.

From the foregoing the need is apparent for a process which is less complicated and time-consuming of making a useful product from the DL-glutamic acid racemate.

An object of the present invention is a process of preparing α-ketoglutaric acid. An additional object is a process of microbiologically converting D-glutamic acid to α-ketoglutaric acid. Another object is a process of preparing α-ketoglutaric acid from a DL-glutamic acid racemate. Another object is such a process whereby the D-glutamic acid is microbiologically converted to α-ketoglutaric acid without substantially affecting the L-glutamic acid. A still further object is to provide a process of preparing α-ketoglutaric acid from a DL-glutamic acid racemate whereby the drawbacks of the prior art processes are either eliminated or minimized. These and other objects will be apparent from the description of the invention given hereinafter.

I have found according to the present invention that the above and other objects are accomplished by carrying out the process which comprises cultivating under aerobic conditions in a nutrient medium including D-glutamic acid a microorganism of the genus Aerobacter having the enzyme D-glutamic acid oxidase, said cultivation being effected until a substantial quantity of the D-glutamic acid has been converted to α-ketoglutaric acid.

The D-glutamic acid as a carbon source in the nutrient medium may be the compound D-glutamic acid as such or it may be D-glutamic acid in admixture with L-glutamic acid either as a racemic mixture, i.e., equal proportions of D-glutamic acid and L-glutamic acid, or a mixture of D-glutamic acid and L-glutamic acid in any other proportions; the recitation in the claims "including D-glutamic acid" is intended to include all these. However, one is more apt to be using the racemic mixture.

The following examples illustrate various specific embodiments of this invention, but they are not intended to limit the invention beyond the scope of the claims of this applictaion. In the examples and elsewhere herein percent and parts are by weight. The L-glutamic acid, D-glutamic acid, and the α-ketoglutaric acid were determined by well-known analytical methods commonly used in this art. The L-glutamic acid was determined quantitatively by the Warburg manometric method used by the Glutamate Manufacturing Association (Methods in Enzymology by Colowick and Katlan, vol. 2, 1955, p. 182, New York Academic Press). The D-glutamic acid and the α-ketoglutaric acid were determined qualitatively by paper chromatography. The α-ketoglutaric acid was determined quantitatively by the Friedemann and Haugens colorimetric method (Friedemann, T. E., and Haugens, G. S., J. Biol. Chem. 147, 415, (1943)).

For the sake of brevity, the following abbreviations are used in the examples of this application: DL-ga means DL-glutamic acid. D-ga means D-glutamic acid. L-ga means L-glutamic acid and α-kga means α-ketoglutaric acid.

EXAMPLES 1–7

These examples illustrate the effect of varying the initial pH of the growth medium, and they show that an initial pH of 7.5 gives higher yields of α-ketoglutaric acid than does an initial pH of 8. They also show that the yields are not much different when using an incubation time of 16 hours versus 40 hours. This is advantageous because one may operate within a wide range of time without being concerned with having to stop the fermentation at any precise time to avoid any possibility of loss of α-kga or L-ga. Further, these examples show operating with and without NaCl in the growth medium.

Seven 100 ml. portions of an aqueous growth medium containing 0.5% D-ga and salts in 500 ml. Erlenmeyer flasks were inoculated with 0.1 ml. portions of *Aerobacter aerogenes* A.T.C.C. 129 liquid stock culture and incubated at 30° C. in a rotatory shaker for the times and at the pH's indicated in Table 1 below. (The stock cultures were considered to contain approximately $10^{-9}$ microorganisms per ml.) The salts in Examples 1–6 medium were $MgSO_4$, $K_2HPO_4$ and NaCl. Example 7 medium contained $MgSO_4$ and $K_2HPO_4$ but no NaCl.

*Table 1*

| Example | 1 | 2 | 3 | 4 | 5 | 6 | 7 |
|---|---|---|---|---|---|---|---|
| Incubation time, hrs | 16 | 22 | 40 | 16 | 22 | 40 | 20 |
| Optical density growth at 650mμ | 0.52 | 0.84 | 0.76 | 0.67 | 0.90 | 0.92 | 0.94 |
| Initial pH | 7.5 | 7.5 | 7.5 | 8 | 8 | 8 | 7.5 |
| End pH | 7.8 | 8.2 | 8.6 | 8.1 | 8.4 | 8.8 | 8.2 |
| mg of α-kga after incubation | 115 | 115 | 115 | 95 | 90 | 87 | 75 |
| α-kga, percent conversion based on D-ga | 46 | 46 | 46 | 38 | 37.2 | 34 | 30 |
| Percent L-ga recovered | 100 | 100 | 100 | 100 | 100 | 100 | 100 |

EXAMPLE 8

Along with a control using DL-glutamic acid alone as the carbon source, several runs were made using DL-glutamic acid plus one additional carbon source. The supplemental carbon sources were sodium citrate, sodium succinate, sodium pyruvate, sodium acetate, sodium lactate, glucose and glycerol. The general incubation conditions were substantially the same as in Example 1. In all runs the supplemental carbon source was used within the range of 0.05%–0.1%, and it decreased the conversion of D-glutamic acid to α-ketoglutaric acid by 20%–85% and activated the overall metabolism so that up to 50% of the L-glutamic acid was utilized by the *Aerobacter aerogene* A.T.C.C. 129.

EXAMPLES 9–14

These examples show the use of three other strains (A.T.C.C. 211, 12657 and 12658) of *Aerobacter aerogenes* in accordance with this invention. The yields of α-kga were up to about one-half the yields obtained with A.T.C.C. 129. These examples were carried out under substantially the same conditions of Examples 1–3 above using incubation times of 24 and 48 hours with each of the three strains.

EXAMPLES 15–18

These examples show that microorganisms which do not contain the enzyme D-glutamic acid oxidase are inoperable in the present invention. These examples were carried out under substantially the same conditions as Examples 9–14 above, using incubation times of 24 and 48 hours with each of the microorganisms *Aerobacter aerogenes* strains A.T.C.C. 7256 and 12409. No α-kga was obtained.

As those skilled in the art will appreciate, the conditions set forth in the above examples may be varied substantially within the scope of the present invention.

The time of incubation is dependent on the inoculum size and the concentration of the carbon source in the growth medium. In general, as the inoculum size increases the incubation time decreases. Usually, as the concentration of the carbon source increases the incubation time increases. Although I have obtained good results using a time of incubation as short as 12 hours and as long as 96 hours, I prefer an incubation time of about 22 hours. For instance, an incumbation time of 12 hours, but otherwise under substantially the same conditions of Example 1, was not quite long enough to convert all of the D-glutamic acid to α-ketoglutaric acid. Normally, the time at which the incubation is discontinued is when substantially no D-glutamic acid remains in the growth medium. As I reduced the DL-glutamic acid concentration from 2.0% to 0.5% at an incubation time of 24 hours (otherwise using substantially the same conditions of Example 1), the yields of α-ketoglutaric acid increased.

I prefer to operate at an incubation temperature of about 30° C. At substantially lower temperatures the rate at which the D-glutamic acid is converted to α-ketoglutaric acid becomes slower. In most cases it would be undesirable to operate below about 25° C. Generally, there is no appreciable advantage in operating above about 30° C. The microorganisms are apt to be seriously damaged, if not killed, at a temperature of about 50° C.

A pH of 6–9 is satisfactory as the initial pH of the growth medium, but a pH of about 7.5 is preferred. A pH outside this range is applicable but the conversion rate is slower.

The medium composition can be varied widely. For example, satisfactory results have been obtained with media having the following percentage ranges and preferred amounts of ingredients: DL-glutamic acid of 0.01–5, preferably 0.5–1; $K_2HPO_4$ of 0.01–2, preferably 0.2; $MgSO_4$ of 0.001–0.2, preferably 0.02; and NaCl of 0–2, preferably 0–0.5. Other phosphate salts are also applicable.

As will be seen from Example 8 hereinbefore the conversion of the D-glutamic acid to α-ketoglutaric acid is less effective when the growth medium contains other sources of carbon besides DL-glutamic acid.

As will be seen from the above examples only those microorganisms of the genus Aerobacter having the enzyme D-glutamic acid oxidase are operable in the present invention. A large number of Aerobacter, besides those in Examples 15–18 above, not having this enzyme were tested under the conditions of this invention and they did not produce any α-ketoglutaric acid.

This invention has been described with reference to specific embodiments thereof in which a growth medium is inoculated with a microorganism; and without any special treatment or modification of the microorganism, it effects the desired conversion while growing on the medium. Thus it is not necessary to become involved with making cell-free preparations or resting cell preparations from the microorganism and then using these preparations to effect the desired conversion. However, resting cell or cell-free preparations, or isolated pure enzymes, can be used within the scope of this invention.

The present invention provides an effective and simple means whereby the D-glutamic acid isomer in a DL-glutamic acid racemate may be converted in an unusually short period of time to α-ketoglutaric acid in substantial yields without affecting the L-glutamic acid isomer. The yields obtained with *Aerobacter aerogenes* A.T.C.C. 129 are exceptionally high. The L-glutamic acid and α-ketoglutaric acid can be separated easily by known means. The α-ketoglutaric acid can be used as such or more L- glutamic acid can be synthesized from it by either chemical- or microbiological known means.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process for preparing α-ketoglutaric acid which comprises cultivating, under aerobic conditions in an aqueous nutrient medium consisting essentially of (1) a compound selected from the group consisting of D-glutamic acid and mixtures of D-glutamic acid and L-glutamic acid, (2) a phosphate salt, and (3) a magnesium salt, an *Aerobacter aerogenes* microorganism of the strain A.T.C.C. 129, said cultivation being carried out until a substantial quantity of the D-glutamic acid is converted to α-ketoglutaric acid in said nutrient medium.

2. Process for preparing α-ketoglutaric acid which comprises cultivating, under aerobic conditions in an aqueous nutrient medium consisting essentially of (1) a compound selected from the group consisting of D-glutamic acid and mixtures of D-glutamic acid and L-glutamic acid, (2) $K_2HPO_4$, and (3) a magnesium salt, an *Aerobacter aerogenes* microorganism of the strain A.T.C.C. 129, said cultivation being carried out until a substantial quantity of the D-glutamic acid is converted to α-ketoglutaric acid in said nutrient medium.

3. Process for preparing α-ketoglutaric acid which comprises cultivating, under aerobic conditions in an aqueous nutrient medium consisting essentially of (1) a compound selected from the group consisting of D-glutamic acid and mixtures of D-glutamic acid and L-glutamic acid, (2) a phosphate salt, and (3) $MgSO_4$, an *Aerobacter aerogenes* microorganism of the strain A.T.C.C. 129, said cultivation being carried out until a substantial quantity of the D-glutamic acid is converted to α-ketoglutaric acid in said nutrient medium.

References Cited in the file of this patent

Izaki et al.: Bull. Agr. Chem. Soc., Japan, volume 19, pp. 233–239 (1955), and volume 22, pages 78–84, abstracted in Chemical Abstracts, volume 50, 13166f (1956), and volume 52, 18662b (1958), respectively.